United States Patent [19]

Green et al.

[11] 3,943,896
[45] Mar. 16, 1976

[54] ELECTRONIC CONTROL OF SPARK ADVANCE AND DWELL

[75] Inventors: Sam J. Green, Temperance, Mich.; Frank J. Raeske, Curtice, Ohio

[73] Assignee: Champion Spark Plug Company, Toledo, Ohio

[22] Filed: Mar. 13, 1974

[21] Appl. No.: 450,828

[52] U.S. Cl.... 123/117 R; 123/146.5 A; 123/148 E
[51] Int. Cl.² ............................................. F02P 5/04
[58] Field of Search ...... 123/117 R, 146.5 A, 148 E

[56] References Cited
UNITED STATES PATENTS

| | | | |
|---|---|---|---|
| 3,314,407 | 4/1967 | Schneider | 123/148 E |
| 3,357,114 | 12/1967 | Green | 123/148 E |
| 3,454,871 | 7/1969 | Nolting | 123/148 E |
| 3,521,611 | 7/1970 | Finch | 123/146.5 |
| 3,738,339 | 6/1973 | Huntzinger | 123/146.5 A |
| 3,791,356 | 2/1974 | Saith | 123/117 R |
| 3,800,757 | 4/1974 | Finch | 123/117 R |
| 3,831,571 | 8/1974 | Weber | 123/148 E |
| 3,853,103 | 12/1974 | Wahl et al | 123/117 R |

*Primary Examiner*—Wendell E. Burns
*Assistant Examiner*—Paul Devinsky
*Attorney, Agent, or Firm*—Oliver E. Todd, Jr.

[57] ABSTRACT

Apparatus for electronically modifying spark advance and dwell in a spark-ignited internal combustion engine. Conventional cam driven breaker points on the engine are initially set for the desired maximum spark advance. The signal from the breaker points is electronically delayed to reduce the spark advance by a predetermined constant value independent of the engine speed. Dwell is also electronically controlled to a predetermined constant value independent of the engine speed.

5 Claims, 3 Drawing Figures

FIG-1-

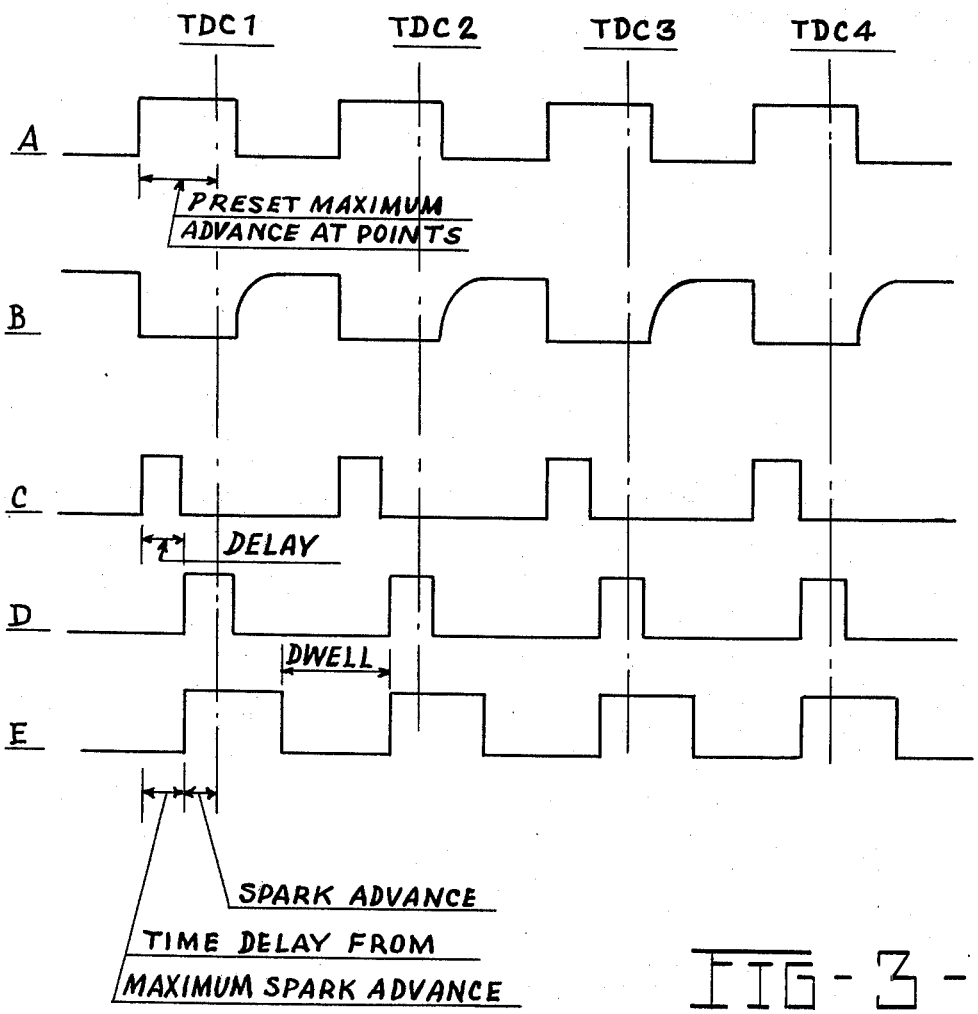

ELECTRONIC CONTROL OF SPARK ADVANCE AND DWELL

BACKGROUND OF THE INVENTION

This invention relates to ignition systems for spark-ignited internal combustion engines and more particularly to apparatus for electronically modifying spark advance and dwell in a spark-ignited internal combustion engine.

The ignition system of a conventional spark-ignited internal combustion engine includes a set of breaker points mounted in a distributor and an ignition coil. The breaker points are periodically closed to allow a current buildup in the primary winding of the ignition coil. An engine driven cam then opens the breaker points and the collapsing magnetic field in the core of the ignition coil establishes a high secondary voltage for firing a spark plug to ignite a compressed fuel-air mixture. The spark is timed to ignite the compressed fuel-air mixture at a predetermined position on the compression stroke. The degree of spark advance or retard is determined by various factors, some of which include engine design, engine speed, engine load, gas quality and exhaust emission standards. In a typical automobile engine, the spark advance is determined by three separate factors: the mechanical setting or orientation between the breaker points and the engine driven cam, a centrifugal advance which increases the spark advance as engine speed increases and a vacuum advance operated in response to the vacuum within the intake manifold on the engine. Another important factor in tuning an internal combustion engine is the dwell of the breaker points. Dwell may be defined as the ratio of the time that the breaker points are closed to the total time of an ignition cycle and is generally referenced as degrees in crankshaft rotation during which the breaker points are closed. The dwell affects the available voltage for firing the spark plugs and is most important at higher engine speeds where the breaker points are closed for a minimum time.

In the conventional spark-ignited internal combustion engine, spark advance and dwell must be mechanically set. The dwell is normally changed by adjusting the maximum gap in the breaker points. In many cases, the engine must be stopped and a cap must be removed from the distributor in which the breaker points are mounted for adjusting dwell. After dwell is adjusted, spark advance is set by physically rotating the distributor housing with respect to the engine driven camshaft which operates the breaker points. Any time the dwell is changed, the spark advance will be affected and therefore must be readjusted. It is sometimes desirable to have the capability of easily changing the spark advance and dwell for an internal combustion engine while such engine is running. For example, there is sometimes a need to easily modify the spark advance and dwell on a running engine for studying or demonstrating the effects of spark advance and dwell on conditions such as engine output power and engine exhaust emissions. However, the ignition system in a conventional internal combustion engine does not lend itself to easily modifying the spark advance and dwell while the engine is running or to modifying the dwell without affecting the spark advance.

SUMMARY OF THE INVENTION

According to the present invention, apparatus is provided for electronically modifying spark advance and dwell in a spark-ignited internal combustion engine while such engine is running. The breaker points on the engine are set for a maximum desirable spark advance. The spark advance is modified during operation of the engine by conventional centrifugal and vacuum advance mechanisms in the distributor. The apparatus is then inserted between the breaker points and the ignition coil for electronically delaying or retarding the application of power to the ignition coil by a time dependent upon engine speed to produce a preselected change in spark advance which is independent of engine speed. The dwell is also electronically controlled to give a preselected constant dwell independent of engine speed.

The signal from the engine breaker points is applied through filtering and shaping circuitry to generate a first pulse train in synchronism with the engine and having a uniform pulse width. The filtered and shaped signal is applied to two frequency-to-voltage converters and to a voltage controlled variable delay one shot multivibrator. One of the frequency-to-voltage converters controls the time delay of the multivibrator. The output of the multivibrator comprises a second pulse train having uniform width pulses which are retarded from the first pulse train by a time inversely proportional to the engine speed. However, as the engine speed increases the pulse width must decrease to maintain a constant dwell. Therefore, the output of the multivibrator is connected to a second variable delay one shot multivibrator. The second frequency-to-voltage converter controls the delay of the second multivibrator for decreasing the pulse width with an increase in pulse frequency caused by an increase in engine speed. The output of the second multivibrator is connected to operate a transistor switch for energizing the ignition coil on the engine. Spark advance may be changed at a location remote from the engine by adjusting the delay in the first multivibrator in relation to the engine speed and dwell may be changed by adjusting the delay in the second multivibrator in relation to the engine speed. Thus, spark advance and dwell are readily adjustable while the engine is running for studying or demonstrating their effect on the engine. Furthermore, the dwell may be changed without affecting spark advance.

Accordingly, it is a preferred object of the invention to provide apparatus for electronically mofifying spark modifying and dwell in a spark-ignited internal combustion engine.

Another object of the invention is to provide apparatus which permits easy adjustment of spark advance and dwell in a spark-ignited internal combustion engine while such engine is running.

Still another object of the invention is to provide apparatus which facilitates studying and demonstrating the effects of spark advance and dwell on a spark-ignited internal combustion engine while such engine is running.

Other objects and advantages of the invention will become apparent from the following detailed description, with reference being made to the accompanying drawings.

BRIEF DESCRIPTION OF THE DRAWINGS

FIG. 3 is a graph showing signals appearing at various designated points in the circuit of FIG. 2.

DESCRIPTION OF THE PREFERRED EMBODIMENTS

Figure 1:
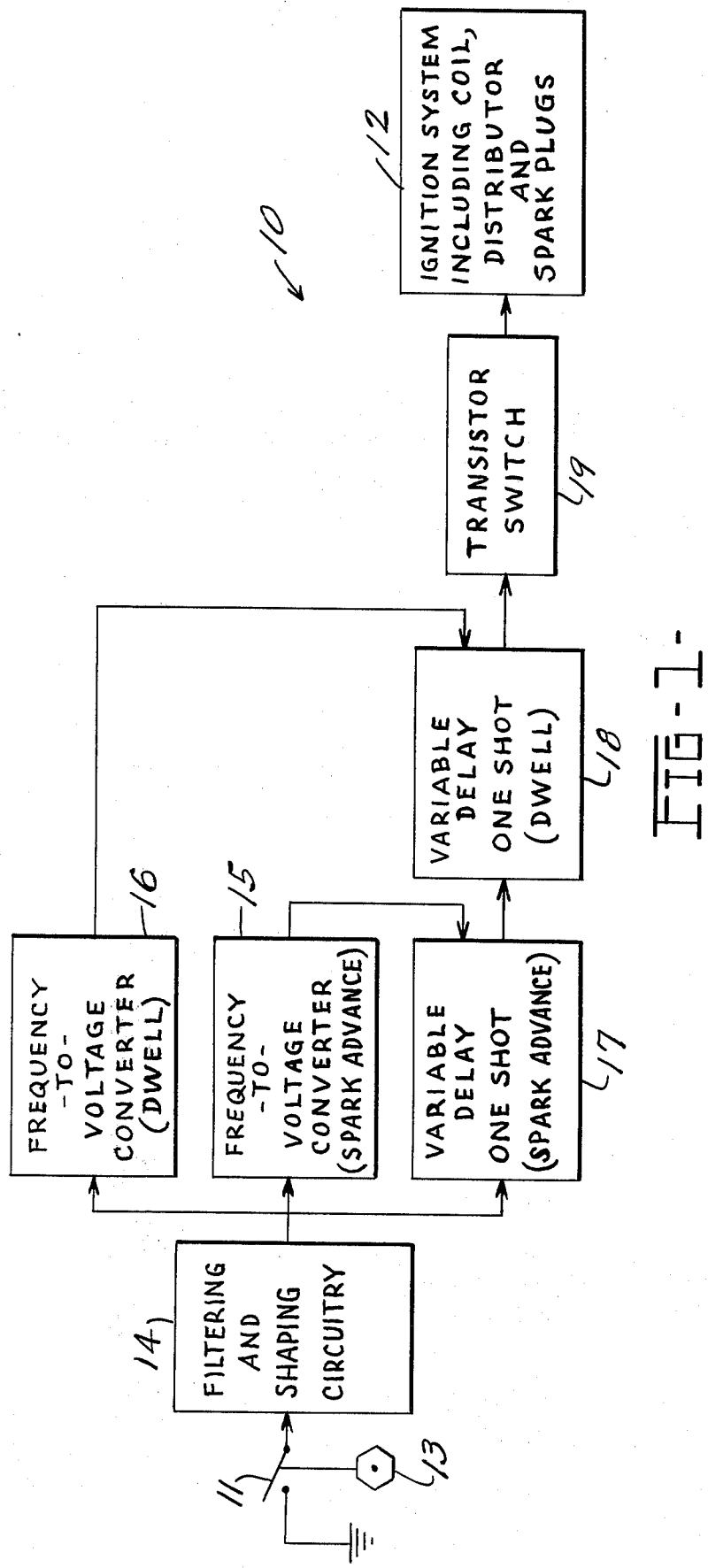
FIG. 1 is a schematic block diagram of apparatus according to the present invention for electronically modifying the spark advance and dwell in a spark-ignited internal combustion engine.

Turning now to the drawings and particularly to FIG. 1, a block diagram is shown of apparatus 10 for electronically modifying spark advance and dwell in a spark-ignited internal combustion engine. The apparatus 10 is designed for insertion between existing breaker points 11 and the remainder of an ignition system 12 for a spark-ignited internal combustion engine. The ignition system 12 includes an ignition coil, a distributor and spark plugs (not shown). During normal operation of the engine, a cam 13 is driven by the engine drive train for periodically opening and closing the breaker points 11. As the breaker points 11 are opened and closed in synchronism with the engine, a pulse train is generated for operating the ignition system 12 to ignite a compressed fuel-air mixture at the appropriate time in each of the cylinders of the engine. Normally, the breaker points 11 are connected between one side of a primary winding on the ignition coil and ground. The points are closed for a period of time determined by the mechanical dwell angle and the engine speed to allow a current buildup in the primary winding of the ignition coil. When the points are opened by the cam 13, the collapsing magnetic field in the ignition coil core establishes a high voltage across the secondary winding of the ignition coil for firing a spark plug selected by the distributor.

According to the present invention, the breaker points 11 are set for a predetermined maximum spark advance. The spark advance will be further increased from this setting by centrifugal and vacuum advance mechanisms in a conventional manner. The apparatus 10 is then inserted between the breaker points 11 and the ignition system 12 to electronically retard the pulse train for achieving desired spark advances less than the predetermined maximum advance. Ideally, the breaker points 11 generate a pulse train having a square or rectangular waveform. However, in practice the waveform is not uniformly smooth due to contact bounce as the breaker points 11 close and also due to electrical noise and voltage fluctuations in the power source from which the ignition system is operated. Therefore, the breaker points 11 are connected to filtering and shaping circuitry 14. The filtering and shaping circuitry 14 has a pulse train output consisting of a series of pulses having a leading edge synchronized with the opening of the breaker points 11 and a predetermined constant pulse width. The pulse train output from the filtering and shaping circuitry 14 is applied simultaneously to a first frequency-to-voltage converter 15, a second frequency-to-voltage converter 16 and a variable delay one shot multivibrator 17. The frequency-to-voltage converters 15 and 16 generate analog output signals having voltage levels which are determined by the frequency of the pulse train from the filtering and shaping circuitry 14. The voltage level of the output from the converter 15 establishes the time delay of the one shot multivibrator 17. As a result, the one shot multivibrator 17 generates an output pulse train similar to, but delayed from, the output of the filtering and shaping circuitry 14 by a time increment which decreases as the pulse frequency increases. Thus, at an idle or slow engine speed, the breaker points 11 will generate a relatively low frequency signal and the pulse train output from the multivibrator 17 will be delayed or retarded by a maximum time increment. As the engine speed increases from an idle, the converter 15 will decrease the delay in the pulse train caused by the one shot multivibrator 17. The actual decrease in the delay is preferably at a rate which maintains the modification in the spark advance constant. The decrease in the delay is required since the total cycle time decreases as the engine speed increases.

The output from the multivibrator 17 will comprise a pulse train having pulses synchronized for operating the ignition system 12 to fire the spark plugs. However, the pulses will be of a uniform narrow pulse width. The maximum pulse width is limited by the highest speed at which the engine is operated. As previously indicated, dwell may be defined as the ratio of the time the ignition points are closed to the total time of an ignition cycle and is normally expressed as degrees of crankshaft rotation during which the breaker points are closed. As the engine speed increases, the total time of an ignition cycle decreases and therefore the time that the breaker points are closed must also decrease to maintain a constant dwell angle. As a consequence, the uniform width pulses in the pulse train from the multivibrator 17 cannot be used directly for operating the ignition system 12.

A second variable delay one shot multivibrator 18 is connected to the output of the multivibrator 7 for maintaining the dwell constant throughout the operating speed range of the engine. The second frequency-to-voltage converter 16 is connected for controlling the delay produced by the multivibrator 18. As the engine speed increases, and hence the frequency of the signal applied to the input of the converter 16 increases, the multivibrator 18 will decrease the delay which establishes the pulse width in an output pulse train. Thus, the multivibrator 18 will have a pulse train output in which the pulses are synchronized with the engine for controlling firing of the spark plugs in the engine ignition system 12. The pulse train will have a uniform dwell, regardless of he engine speed. The pulse train from the multivibrator 18 is applied to a transistorized or electronic switch 19 which controls current flow in the primary winding of the ignition coil in the engine ignition system 12.

The actual spark advance and dwell in the pulse train applied to the ignition system 12 may be readily varied or changed by means of the apparatus 10. The frequency-to-voltage converters 15 and 16, for example, may be provided with controls for calibrating the output voltage levels for any given input frequency. By changing the output level of the converter 15 for a fixed engine speed, the spark advance generated in the multivibrator 17 will be changed. Similarly, by varying the output level from the converter 16 for a fixed engine speed, the dwell angle established by the multivibrator 18 will be changed. Alternatively, controls may be provided in the multivibrators 17 and 18 for adjusting or changing the spark advance and dwell.

Figure 2:
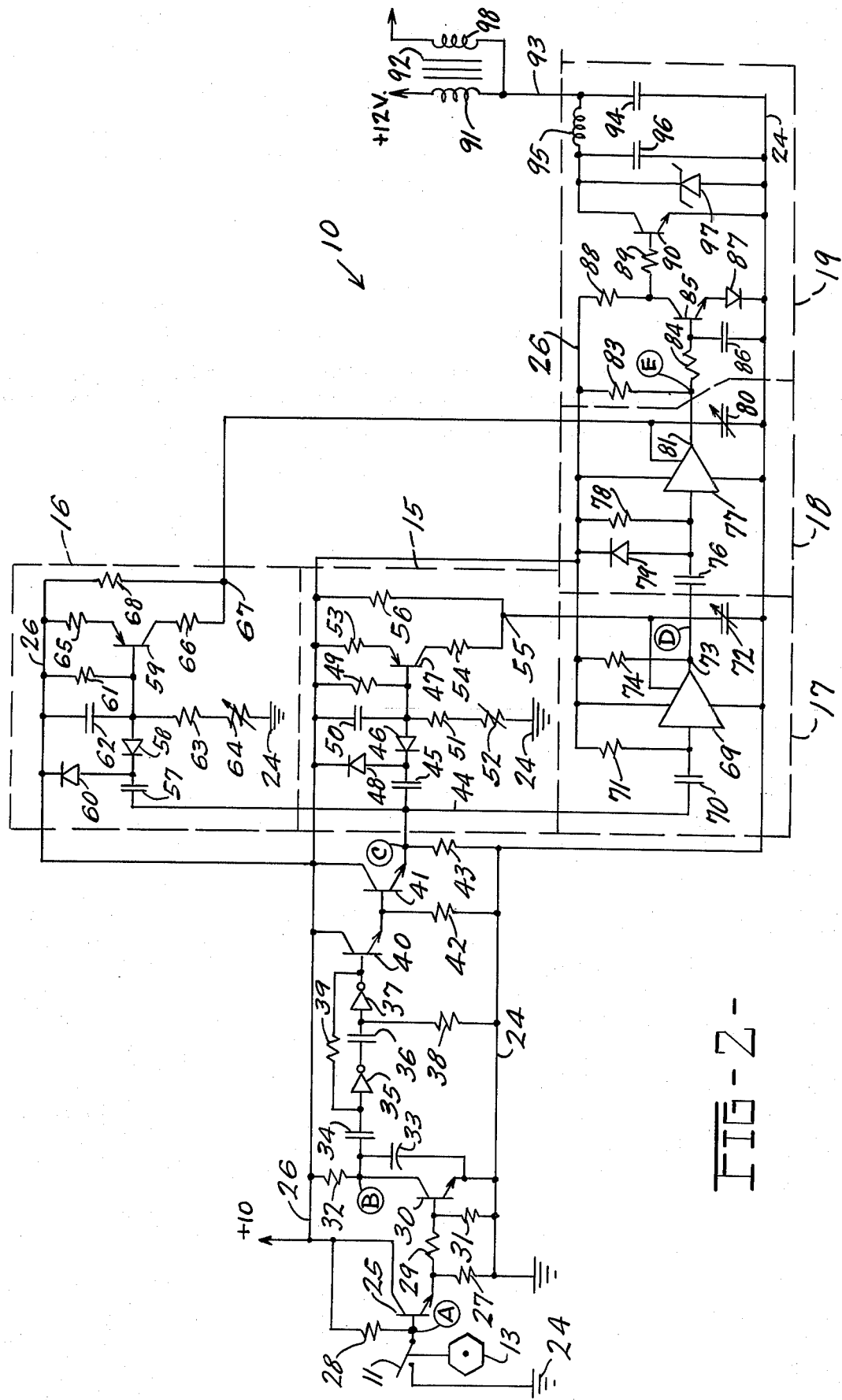
FIG. 2 is a detailed schematic circuit diagram of apparatus embodying the principles of the present invention.

Turning now to FIGS. 2 and 3, the apparatus 10 for electronically controlling spark advance and dwell is shown in detail. The breaker points 11 are connected between a common ground 24 and the base of a buffer transistor 25. The collector of the transistor 25 is connected to a positive power buss 26 while the emitter of the transistor 25 is connected through a resistor 27 to ground 24. A bias resistor 28 is connected between the base of the transistor 25 and the positive buss 26. The transistor 25 will be either conducting or non-conducting, depending upon the position of the breaker points 11. The emitter of the transistor 25 is connected to apply a signal or pulse train through a resistor 29 to the base of a transistor 30. The base of the transistor 30 is also connected through a resistor 31 to ground 24. The emitter of the transistor 30 is connected directly to ground 24 while the collector is connected through a resistor 32 to the positive buss 26. A capacitor 33 is connected between the collector and emitter of the transistor 30 for shunting the output of the transistor 30. FIG. 3A shows a typical pulse train appearing at the point A between the breaker points 11 and the base of the transistor 25 as the breaker points are driven by the cam 13. The resulting pulse train appearing at the output of the transistor 30, as designated by the point B, is shown in FIG. 3B. However, it will be appreciated that the graph shown in FIGS. 3A and 3B are idealistic. In reality, the breaker points 11 may bounce when they are closed and arc when they are opened, resulting in noise on the pulse trains. The pulse trains may also vary in magnitude as a consequence of variations in and noise on the voltage applied to the positive buss 26 from the electrical system for the engine.

The output from the collector of the transistor 30 is applied to a one shot multivibrator for generating a uniform width pulse train synchronized with actuation of the breaker points 11. The one shot multivibrator includes a capacitor 34, an inverter 35, a capacitor 36 and an inverter 37. The pulsed output at the collector of the transistor 30 is applied through the capacitor 34 to the inverter 35. The output of the inverter 35 is in turn applied through the capacitor 36 to the inverter 37. A resistor 38 is connected between the input to the inverter 37 and ground 24 and a resistor 39 is connected between the output of the inverter 37 and the input of the inverter 35. Each time a pulse is applied from the collector of the transistor 30 to the capacitor 34, a constant or predetermined width pulse will appear at the output of the inverter 37. This pulse may, for example, be designed to have a one millisecond width. The output of the one shot multivibrator, as appearing at the output from the inverter 37, is fed through two stages of amplification consisting of two transistors 40 and 41. Both transistors 40 and 41 are operated as emitter followers. The collectors of the transistors 40 and 41 are connected to the positive buss 26 while the emitter of the transistor 40 is connected through a resistor 42 to ground 24 and directly to the base of the transistor 41. The emitter of the transistor 41 is connected through a resistor 43 to ground 24 and is also connected to a junction 44. The output applied from the emitter of the transistor 41 to the junction 44 will be a noise-free pulse train having constant pulse widths, as shown in FIG. 3C. It will be noted that the leading edges of the pulses in FIG. 3C correspond to the leading edges of the pulses in FIG. 3A generated at openings of the breaker points 11. The pulse train on the junction 44, as shown in FIG. 3C, is applied to inputs of the frequency-to-voltage converter 15, the frequency-to-voltage converter 16 and the variable delay one shot multivibrator 17.

The frequency-to-voltage converter 15 generates an analog output signal having a voltage level dependent upon the frequency of the pulse train appearing on the junction 44. The junction 44 is connected through a capacitor 45 and a diode 46 to the base of a transistor 47 in the converter 15. The junction between the capacitor 45 and the diode 46 is also connected through a diode 48 to the positive buss 26. The base of the transistor 47 is connected through a parallel resistor 49 and capacitor 50 to the positive buss 26 and also through a series connected fixed resistor 51 and variable resistor 52 to ground 24. The emitter of the transistor 47 is connected through a resistor 53 to the positive buss 26 while the collector is connected through a resistor 54 to an output junction 55. A resistor 56 is also connected between the positive buss 26 and the junction 55. In operation, the capacitor 45, the diodes 46 and 48 and the capacitor 50 generate an output voltage which is dependent upon the input frequency on the junction 44. This voltage is amplified by the transistor 47 and applied to the output junction 55. The variable resistor 52 is provided for calibrating the output from the frequency-to-voltage converter.

The frequency-to-voltage converter 16 is similar to the converter 15. The junction 44 is connected through a capacitor 57 and a diode 58 to the base of a transistor 59. The junction between the capacitor 57 and the diode 58 is also connected through a diode 60 to the positive buss 26. The base of the transistor 59 is connected through a parallel resistor 61 and capacitor 62 to the positive buss 26 and through a series connected fixed resistor 63 and variable resistor 64 to ground 24. The emitter of the transistor 59 is connected through a resistor 65 to the positive buss 26 and the collector is connected through a resistor 66 to an output junction 67. A resistor 68 is also connected between the positive buss 26 and the junction 67. As with the converter 15, the capacitor 57, the diodes 58 and 60 and the capacitor 62 generate a voltage which is proportional to the frequency of the pulse train on the junction 44. This signal is amplified by the transistor 59 and applied to the output junction 67. Thus, the signal appearing on the junction 67 is proportional to the frequency at which the breaker points 11 are actuated by the engine driven cam 13.

The frequency-to-voltage converter 15 and the variable delay one shot multivibrator 17 function to retard the pulse train appearing on the junction 44 by a predetermined time increment to obtain the correct timing for firing the spark plugs in the engine. The actual time increment that the pulse train on the junction 44 is retarded is determined by the voltage on the output junction 55 from the converter 15 and by the setting of a spark advance control within the multivibrator 17. The multivibrator 17 primarily consists of an integrated circuit voltage level controlled dual comparator 69, which, for example, may consist of a type NE 555 integrated circuit. The junction 44 is connected through a capacitor 70 to an input to the comparator 69. This input to the comparator 69 is also connected through a resistor 71 to the positive buss 26. The output junction 55 from the converter 15 is connected to a second input to the comparator 69 and also through a variable capacitor 72 to ground 24. The comparator 69 has an output 73 which is connected through a resistor 74 to the positive buss 26 and also is connected to the variable delay one shot multivibrator 18. The signal appearing on the output 73 from the comparator 69 is shown in FIG. 3D. The pulse train in FIG. 3D is similar to that in FIG. 3C except that it is retarded by a predetermined amount such that the leading edge of each pulse defines the desired time for firing the spark plugs in the engine. The actual degree to which the pulse train in FIG. 3D is retarded from the pulse train in FIG. 3C is controlled by the variable capacitor 72. The capacitor 72 has been shown as a single variable capacitor to simplify the drawings. However, the capacitor 72 preferably consists of a plurality of fixed capacitors which are selectively connected to the junction 55 by means of a spark advance selector switch (not shown). The fixed capacitors may be selected to provide desired incremental changes or shifts in spark advance. Furthermore, continuously variable capacitors may not be readily available in desired ranges for use in the circuit of FIG. 2.

As shown in FIG. 3D, the pulse train appearing at the output 73 from the multivibrator 17 consists of a series of constant width pulses. The variable delay one shot multivibrator 18 modifies the width of the pulses in response to the frequency of the signal on the junction 44 for establishing a predetermined constant dwell angle. When the apparatus 10, and particularly the converter 16, is properly calibrated the dwell angle will remain constant throughout the speed range in which the connected engine is operated. The variable delay multivibrator 18 uses the analog signal on the output junction 67 from the frequency-to-voltage converter 16 to control the pulse width in a manner similar to that in which the multivibrator 17 uses the analog output signal from the frequency-to-voltage converter 15 to control spark retard.

The output 73 from the multivibrator 17 is applied through a capacitor 76 to an input to a voltage level controlled dual comparator 77. This input to the comparator 77 is also connected through a parallel resistor 78 and diode 79 to the positive buss 26. The output junction 67 from the converter 16 is connected to a second input on the comparator 77 and through a variable capacitor 80 to ground 24. The comparator 77 will produce a pulse train on an output 81 which is similar to the pulse train on the output 73 from the comparator 69, except that the pulse train has a dwell determined by the value of the capacitor 80. The output 81 is connected through a resistor 83 to the positive buss 26. The capacitor 80 preferably consists of a plurality of calibrated capacitors which are selectively connected to the junction 67 by means of a dwell selector switch (not shown). A typical signal appearing at the output 81 from the comparator 77 is shown in FIG. 3E. It will be noted that the leading edges of the pulses of the pulse train in FIG. 3E correspond with the leading edges of the pulses in the pulse train of FIG. 3D.

The pulse train at the output 81 from the multivibrator 18 operates the transistor switch 19. The output 81 is connected through a resistor 84 to the base of a transistor 85. A capacitor 86 is also connected from the base of the transistor 85 to ground 24. The emitter of the transistor 85 is connected through a diode 87 to ground 24 while the collector is connected through a resistor 88 to the positive buss 26 and through a resistor 89 to the base of a power switching transistor 90. The transistor 90 controls current flow in a primary winding 91 of an ignition coil 92. The primary winding 91 is connected between a power source (not shown) for operating the engine, such as a 12-volt battery, and a junction 93. The junction 93 is connected through a capacitor 94 to ground and through an inductor 95 to the collector of the transistor 90. A capacitor 96 and a Zener diode 97 are also connected in parallel between the collector and the grounded emitter of the transistor 90.

During operation of the engine, the cam 13 causes the breaker points 11 to generate a signal of the type shown in FIG. 3A. The filtering circuitry 14, the converters 15 and 16 and the multivibrators 17 and 18 function to generate a signal of the type shown in FIG. 3E. This signal is applied through a buffer amplifier transistor 85 to drive the power switching transistor 90 for controlling current in the primary winding 91 of the ignition coil 92. Current builds up in the primary winding 91 while the transistor 90 is conducting. When the transistor 90 is then switched to interrupt the current flow, energy stored in the core of the ignition coil 92 induces a high voltage across a secondary winding 98 for firing a spark plug (not shown). During this time, the capacitor 94 functions in a manner similar to the capacitor normally connected in parallel with the breaker points 11 in an engine ignition system for completing the electrical path to ground 24. The inductor 95, the capacitor 96 and the Zener diode 97 are provided for protecting the transistor 90 from high voltage transients from the ignition coil 92.

The apparatus 10 is particularly suitable for use in either studying or demonstrating the effects of spark advance and dwell on the operation of a spark-ignited internal combustion engine. The capacitors 72 and 80 may be varied for determining the most efficient settings of spark advance and dwell, respectively, while the engine is operating. Or, an an alternative, the capacitors 72 and 80 may consist of accurately calibrated capacitors and switches for selectively connecting these capacitors in the circuit to obtain predetermined increments of spark advance and dwell to demonstrate the effects of spark advance and dwell in a classroom environment. The spark advance may be calibrated, for example, to permit selection ranging in five degree increments from minus five degrees, or a five degree retard from top dead center, to plus twenty degrees advance. Similarly, the capacitor 80 is switched for selecting accurate dwell angles ranging from a minimum of perhaps five degrees to a maximum of perhaps forty degrees or more in small increments.

Although the apparatus 10 has been described in operation with an internal combustion engine having breaker points 11 driven by a cam 13, it will be appreciated that other well known types of ignition timing pulse generators may be used in their place. For example, the breaker points 11 may be replaced with a magnetic pickup and an amplifier. The magnetic pickup senses either the lobes on the cam 13 or lobes or magnets on a trigger wheel for generating pulses in synchronism with the engine. Or, in still another embodiment, the breaker points 11 may be replaced with an optical pickup. In place of the cam 13, a shutter is driven by the engine. A light source and a light sensor are positioned on opposite sides of the shutter. As the shutter rotates, the light sensor generates a pulse stream similar to that generated by the breaker points 11.

It will be appreciated that various other changes and modifications may be made in the above-described preferred embodiment of the invention. For example, a specific circuitry has been described for the frequency-to-voltage converters 15 and 16 and a specific circuitry has been described for the variable delay one shot multivibrators 17 and 18. However, the converters 15 and 16 may be replaced with other known types of frequency-to-voltage converters and the multivibrators 17 and 18 may be replaced with other known types of variable delay multivibrators. Various other changes and modifications may also be made without departing from the spirit and the scope of the claimed invention.

What we claim is:

1. In an ignition system for a spark-ignited internal combustion engine including means for generating a timed pulse train synchronized with the engine, said pulse train having a predetermined spark advance curve, and an ignition coil for generating high voltage pulses for firing at least one spark plug in the engine, an electronic timing control circuit comprising, in combination, means for electronically modifying the timing and the pulse width of the engine generated pulse train to obtain a modified pulse train having a preselected modification in the predetermined spark advance curve for all engine speeds and having a predetermined dwell, and switch means responsive to such modified pulse train for controlling current flow in a primary winding of the ignition coil, said modifying means including frequency-to-voltage converter means having an analog output determined by the frequency of the engine generated pulse train, and time delay means responsive to such analog output for delaying the engine generated pulse train by a time increment which decreases linearly as the frequency of the engine generated pulse train increases whereby the preselected modification in the spark advance curve remains constant for all engine speeds.

2. An electronic timing control circuit for an ignition system in a spark-ignited internal combustion engine, as set forth in claim 1, and including means for selectively changing the time increment in which the engine generated pulse train is delayed whereby the preselected modification in the predetermined spark advance curve is selectively changed.

3. In an ignition system for a spark-ignited internal combustion engine including means for generating a timed pulse train in synchronism with the engine, said pulse train having a predetermined spark advance curve, and an ignition coil for generating high voltage pulses for firing spark plugs, an electronic timing control circuit comprising, in combination, means for generating a second pulse train having uniform width pulses delayed from pulses in said engine generated pulse train by a time increment which is inversely proportional to the frequency of the engine generated pulse train, such second pulse train having a spark advance modified from the predetermined spark advance curve by a preselected constant amount, means for generating a third pulse train having pulses synchronized with pulses in such second pulse train and having pulse widths inversely proportional to the frequency of the engine generated pulse train, such third pulse train having a predetermined constant dwell, and switch means responsive to such third pulse train for controlling current flow in a primary winding of the ignition coil.

4. An electronic timing control circuit for an ignition system in a spark-ignited internal combustion engine, as set forth in claim 3, wherein said second pulse train generating means comprises frequency-to-voltage converter means having an analog output determined by the frequency of the engine generated pulse train, and time delay multivibrator means responsive to the engine generated pulse train for generating such second pulse train, said multivibrator means having a time delay controlled by the analog output from said frequency-to-voltage converter to decrease as the frequency of the engine generated pulse train increases.

5. An electronic timing control circuit for an ignition system in a spark-ignited internal combustion engine, as set forth in claim 4 wherein said third pulse train generating means comprises second frequency-to-voltage converter means having an analog output determined by the frequency of the engine generated pulse train, and second multivibrator means responsive to such second pulse train for generating such third pulse train, said second multivibrator means controlling the pulse width in such third pulse train in response to the analog output from said second frequency-to-voltage converter to decrease the pulse width as the frequency of the engine generated pulse train increases.

* * * * *